United States Patent
Kim et al.

(10) Patent No.: US 9,977,588 B2
(45) Date of Patent: May 22, 2018

(54) DISPLAY CONTROL APPARATUS, DISPLAY CONTROL METHOD, AND COMPUTER PROGRAM FOR EXECUTING THE DISPLAY CONTROL METHOD

(71) Applicant: NAVER WEBTOON CORPORATION, Seongnam-si, Gyeonggi-do (KR)

(72) Inventors: Dong Mi Kim, Seongnam-si (KR); Yong Jun Kwon, Seongnam-si (KR); Hyun Joon Park, Seongnam-si (KR); Myeong Seok Yang, Seongnam-si (KR)

(73) Assignee: NAVER Webtoon Corporation, Seongnam-si (KR)

( * ) Notice: Subject to any disclaimer, the term of this patent is extended or adjusted under 35 U.S.C. 154(b) by 347 days.

(21) Appl. No.: 14/620,437

(22) Filed: Feb. 12, 2015

(65) Prior Publication Data
US 2016/0041713 A1      Feb. 11, 2016

(30) Foreign Application Priority Data
Aug. 7, 2014  (KR) .................. 10-2014-0101793

(51) Int. Cl.
G06F 3/0481      (2013.01)
G06F 3/0485      (2013.01)
G06F 3/0488      (2013.01)

(52) U.S. Cl.
CPC .......... *G06F 3/0485* (2013.01); *G06F 3/0488* (2013.01)

(58) Field of Classification Search
CPC .............................. G06F 3/0485; G06F 3/017
(Continued)

(56) References Cited

U.S. PATENT DOCUMENTS 5,856,827 A      1/1999   Sudo
8,799,806 B2 *   8/2014   Stallings ............. G06F 3/04812
                                                          715/777
(Continued)

FOREIGN PATENT DOCUMENTS

JP      9-233161       9/1997
JP      2001-308991    11/2001
(Continued)

OTHER PUBLICATIONS

Korean office action issued in corresponding Korean Patent App. No. 10-2014-0101703, dated Jul. 29, 2015.
(Continued)

*Primary Examiner* — Phuong H Nguyen
(74) *Attorney, Agent, or Firm* — Greer Burns & Crain Ltd.

(57) ABSTRACT

Provided is a computer-implemented display control method including a first display operation of displaying, in a second region of a screen, a first page on which contents belonging to a first category are arranged, and listing a plurality of categories in a vertical or horizontal direction and displaying the plurality of categories in a first region of the screen, wherein the first page is displayed to be scrollable in a direction in which the plurality of categories are listed, a recognition operation of recognizing a scroll signal which is input with respect to the first page, a determination operation of scrolling the first page based on the scroll signal, and generating a category change command based on the scroll signal if scrolling is not possible according to a position of the first page, and a second display operation of displaying, on the second region, a second page on which contents belonging to a second category are arranged, if it is determined to change the category based on the scroll signal.

15 Claims, 6 Drawing Sheets

(58) Field of Classification Search
USPC .................................. 715/784–787, 833, 863
See application file for complete search history.

(56) References Cited

U.S. PATENT DOCUMENTS

| | | |
|---|---|---|
| 2012/0060111 A1 | 3/2012 | Kim |
| 2013/0145290 A1* | 6/2013 | Weber ................. G06F 3/04883 715/760 |
| 2014/0092125 A1* | 4/2014 | Max ....................... G09G 5/003 345/629 |
| 2014/0096071 A1 | 4/2014 | Tomita |

FOREIGN PATENT DOCUMENTS

| | | |
|---|---|---|
| JP | 2010-113420 | 5/2010 |
| JP | 2013-161379 | 8/2013 |
| JP | 2013-161427 | 8/2013 |
| JP | 2013-200894 | 10/2013 |
| JP | 2014-74980 | 4/2014 |
| JP | 2014-123402 | 7/2014 |
| JP | 2014-132414 | 7/2014 |
| KR | 10-2012-0022437 | 3/2012 |

OTHER PUBLICATIONS

Office Action issued in corresponding Japanese patent application No. 2015-003041, dated Dec. 15, 2015.
Office Action issued in corresponding Korean Patent App. No. 10-2014-0101793, dated May 2, 2012.
Second Office Action issued in corresponding Japanese patent application No. 2015-003041, dated Jun. 7, 2016.

* cited by examiner

DISPLAY CONTROL APPARATUS, DISPLAY CONTROL METHOD, AND COMPUTER PROGRAM FOR EXECUTING THE DISPLAY CONTROL METHOD

RELATED APPLICATION

This application claims the benefit of Korean Patent Application No. 10-2014-0101793, filed on Aug. 7, 2014, in the Korean Intellectual Property Office, the disclosure of which is incorporated herein in its entirety by reference.

BACKGROUND

One or more exemplary embodiments of the present invention relate to a display control apparatus, a display control method, and a computer program for executing the display control method on a computer.

Moving a page displayed on a screen or a panel in a vertical and/or horizontal direction is referred to as scrolling. New information appears on the opposite side corresponding to a portion that disappears from the screen. Since the amount of information displayed on one page is larger than the amount of information that can be displayed on the screen, this scrolling function is frequently used. A viewer may read information on the screen while scrolling. Display devices such as a console, a word processor, a mobile terminal, a Personal Computer (PC), and the like mostly have a scrolling function.

When an external device such as a mouse is provided, scrolling may be performed by moving a wheel or dragging a scroll bar; if a touch pad is provided, scrolling may be performed by directly clicking or dragging a page on a screen.

SUMMARY

One or more exemplary embodiments of the present invention include a display control apparatus, a display control method, and a computer program for executing the display control method on a computer, in which by using a scroll signal, page scroll and page change may be performed.

Additional aspects will be set forth in part in the description which follows and will be apparent from the description, or may be learned by practice of the presented embodiments.

According to one or more exemplary embodiments, a computer-implemented display control method includes a first display operation of displaying, on a second region of a screen, a first page on which contents belonging to a first category are arranged, and listing a plurality of categories in a vertical or horizontal direction and displaying the plurality of categories on a first region of the screen, wherein the first page is displayed to be scrollable in a direction in which the plurality of categories are listed, a recognition operation of recognizing a scroll signal which is input with respect to the first page, a determination operation of scrolling the first page based on the scroll signal, and generating a category change command based on the scroll signal if scrolling is not possible according to a position of the first page, and a second display operation of displaying, on the second region, a second page on which contents belonging to a second category are arranged, if it is determined to change the category based on the scroll signal.

According to one or more exemplary embodiments, apparatus for controlling display of a screen, the apparatus including a scroll recognizing unit configured to recognize a scroll signal which is input with respect to a first page displayed on a second region of the screen, a scroll determining unit configured to scroll the first page based on the scroll signal, and to generate a category change command based on the scroll signal if scrolling is not possible according to a position of the first page, and a display control unit configured to display, on the second region of the screen, the first page on which contents belonging to a first category are arranged, to list a plurality of categories in a vertical or horizontal direction and display the plurality of categories on a first region of the screen, wherein the first page is displayed to be scrollable in a direction in which the plurality of categories are listed, and to display, on the second region, a second page on which contents belonging to a second category are arranged, if it is determined to change the category based on the scroll signal.

According to one or more exemplary embodiments, a computer program stored on a medium to execute the display control method by using a computer is provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
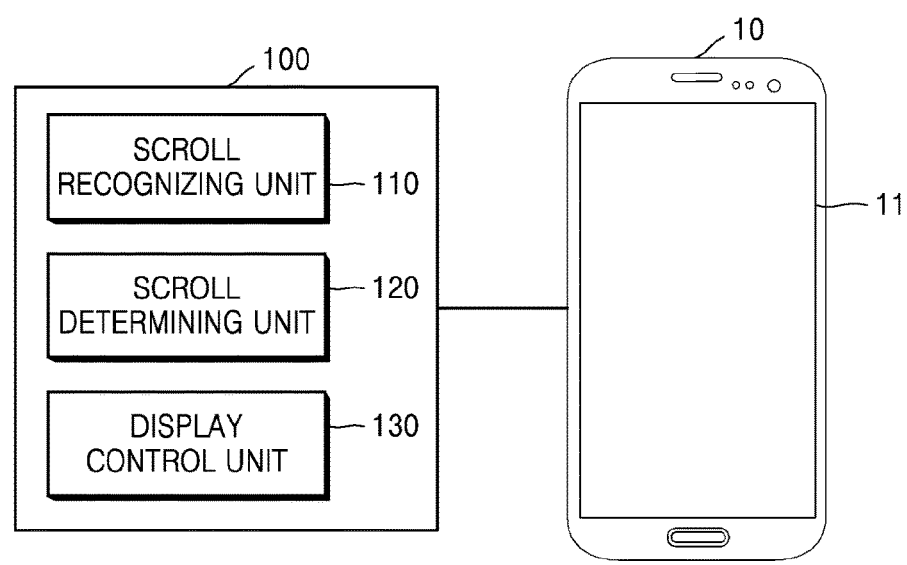
FIG. 1 is a diagram schematically illustrating a display control apparatus according to an embodiment of the inventive concept.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are described below, by referring to the figures, to explain aspects of the present description. Expressions such as "at least one of," when preceding a list of elements, modify the entire list of elements and do not modify the individual elements of the list.

In the following embodiments, terms such as "first", "second", and so forth are used only for distinguishing one component from another component, rather than for restrictive meanings. In the following embodiments, the singular forms are intended to include the plural forms as well, unless the context clearly indicates otherwise. In the following embodiments, the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

FIG. 1 is a diagram schematically illustrating a display control apparatus 100 according to an embodiment of the inventive concept.

The display control apparatus 100 provided according to an embodiment of the inventive concept may correspond to or include at least one processor. Thus, the display control apparatus 100 may be driven in a form included in another hardware device such as a micro-processor or a computer system. For example, the display control apparatus 100 may be mounted on a terminal including a display unit capable of displaying a screen.

To prevent a feature of the current embodiment from being obscured, only components of the display control apparatus 100 which are associated with the current embodiment are illustrated. Thus, it would be obvious to a person skilled in the art that general-purpose components other than the components illustrated in FIG. 1 may be further included.

The display control apparatus 100 according to an embodiment of the inventive concept controls display of a screen 11 of a terminal 10. The display control apparatus 100 according to an embodiment of the inventive concept may provide a User Interface (UI) for displaying multimedia content. The display control apparatus 100 according to an embodiment controls display of multimedia content belonging to a plurality of categories. The multimedia content may be, for example, webcomic content, and the display control apparatus 100 according to an embodiment may classify webcomic content according to category and display webcomic content belonging to one category on a page.

When a page displayed on the screen 11 is scrolled, the display control apparatus 100 according to an embodiment controls the display of the page. For example, the display control apparatus 100 changes the displayed page into another page according to a scroll direction when the page is scrolled or the page is scrolled to the end and thus no further scrolling is possible. The display control apparatus 100 according to an embodiment includes a scroll recognizing unit 110, a scroll determining unit 120, and a display control unit 130.

The scroll recognizing unit 110 recognizes a scroll signal input by a user. The scroll signal may be input with respect to the page displayed on the screen 11. The scroll recognizing unit 110 recognizes various parameters of the scroll signal. The parameters may include speed, direction, position, and so forth, of the scroll signal. The scroll signal may be input as an operation, such as a drag, a gesture, a motion, or the like, using a touch panel, may be input using a separate input device such as a wheel of a mouse, a joypad, or the like, or may be input by manipulation of a scroll bar displayed on the screen 11, but a method of inputting the scroll signal is not limited to a special method.

The scroll determining unit 120 according to an embodiment controls scroll of the page displayed on the screen 11, based on the recognized scroll signal. The scroll determining unit 120 generates a command for a page change if no further scrolling is possible according to a position of the page on the screen 11. For example, if the page is scrolled to the end and thus no further scrolling is possible, the scroll determining unit 120 generates a command for transiting the page displayed on the screen 11 to another page. The page may be associated with one category, the command may be a category change command, and according to the command, the page associated with the category may be transited to a page associated with another category.

The scroll determining unit 120 determines whether further page scrolling is not possible, according to a scroll direction of the page and a position of the page on the screen 11 based on the scroll signal. The scroll determining unit 120 may determine that further first-direction scrolling of the page is not possible if a first-direction endmost portion of the page displayed on the screen 11 is positioned at an edge of the screen 11. For example, if the bottom end of the page is positioned at an edge of a lower end of the screen 11, the scroll determining unit 120 determines that further scrolling down of the page is not possible, and generates a category change command.

The scroll determining unit 120 may also consider the direction of the scroll signal. For example, if the direction of the scroll signal is a direction for scrolling the page in the first direction and the first-direction endmost portion of the page is positioned at an edge of the screen 11, the scroll determining unit 120 determines that the further first-direction scrolling of the page is not possible, thus generating a category change command.

Considering operations of the scroll determining unit 120 according to the foregoing embodiment, the scroll signal is basically used to scroll the page, but if further page scrolling is not possible, the scroll signal may be used for a category change.

The scroll determining unit 120 according to another embodiment may determine the purpose of the scroll signal by using the recognized scroll signal. A criterion for determining the purpose of the scroll signal may be a direction of the scroll signal and a position of the page on the screen 11. For example, if a scroll signal for scrolling down the page is input and the scroll down of the page is possible, then the scroll determining unit 120 determines that the purpose of the input scroll signal is a page scroll. On the other hand, if the scroll signal for scrolling down the page is input and the bottom end of the page is positioned at an edge of the lower end of the screen 11, such that further scrolling down is not possible, then the scroll determining unit 120 determines that the purpose of the input scroll signal is a category change.

Once it is determined that the purpose of the input scroll signal is a page scroll, the scroll determining unit 120 generates a scroll command to control scrolling of the page; otherwise, if it is determined that the purpose of the input scroll signal is a category change, the scroll determining unit 120 generates a category change command.

The scroll determining unit 120 according to an embodiment may further determine whether the input scroll signal satisfies preset conditions. If it is determined that further page scrolling is not possible, the scroll determining unit 120 may determine once more whether the input scroll signal satisfies preset drag conditions. If the input scroll signal satisfies the drag conditions, the scroll determining unit 120 generates a category change command based on the input scroll signal; otherwise, if the input scroll signal does not meet the drag conditions, the scroll determining unit 120 does not perform the page scroll or generate the category change command and may not perform any operation.

The drag conditions are applied to a drag signal if the scroll signal is the drag signal, in which at least one parameter of length and speed of the drag signal and a total time in which the drag signal is input exceed a preset criterion. More specifically, the drag conditions may include a first condition that the length of the drag signal exceeds a preset condition, a second condition that the drag signal passes through a preset point, and a combination thereof. The drag signal may be a continuous touch signal.

The display control unit 130 controls display of the screen 11 based on the scroll signal and the category change command. For example, the display control unit 130 may display a page in a second region of the screen 11, and show a category list in a first region of the screen 11. The page displayed in the second region may include contents belonging to a category from the category list displayed in the first region. If a first page is displayed, contents belonging to the first category are shown on the first page, and if a second page is displayed, contents belonging to a second category are shown on the second page.

The display control unit 130 displays a plurality of categories included in the category list in different colors. The color of a region of a background of the page displayed in the second region may be based on the color of a corresponding category.

The display control unit 130 may highlight the category corresponding to the page displayed in the second region out of the category list displayed in the first region. The display control unit 130 may highlight the first category from the category list during the display of the first page in the second region, and if the first page transits to the second page according to a category change command, the display control unit 130 may release the highlight of the first category from the category list and highlight the second category.

The display control unit 130 lists the plurality of categories in the first region in a vertical (up/down or top/bottom) or horizontal (left/right) direction, and displays the page displayed in the second region positioned adjacent to the first region in such a way to be scrolled in a direction in which a plurality of categories are listed in the second region. For example, if the plurality of categories are listed in the first region in the vertical direction, the page displayed in the second region is displayed in such a way to be scrolled in the vertical direction. If the plurality of categories are listed in the first region in the horizontal direction, the page displayed in the second region is displayed in such a way to be scrolled in the horizontal direction.

The display control unit 130 scrolls the page displayed in the second region based on the scroll signal. The display control unit 130 transits the page displayed in the second region according to the category change command. For example, display of the first page including contents belonging to the first category is transited to display of the second page including contents belonging to the second category.

Once the scroll determining unit 120 generates a category change command and thus the display control unit 130 changes the category and displays the changed category, the category change command may be a change command from the first category to the second category. Herein, the first category corresponds to the first page displayed on the current screen, and the second category is shown adjacent to the first category in the category list. If a plurality of categories are shown in a line, two categories are adjacent to the first category, and in this case, the second category may be determined according to a direction of the scroll signal or a scroll direction of a page corresponding to the scroll signal. For example, if the scroll signal is a signal for scrolling down the page, a category under the first category may be determined as the second category. On the other hand, if the scroll signal is a signal for scrolling up the page, a category above the first category may be determined as the second category.

Figure 2:
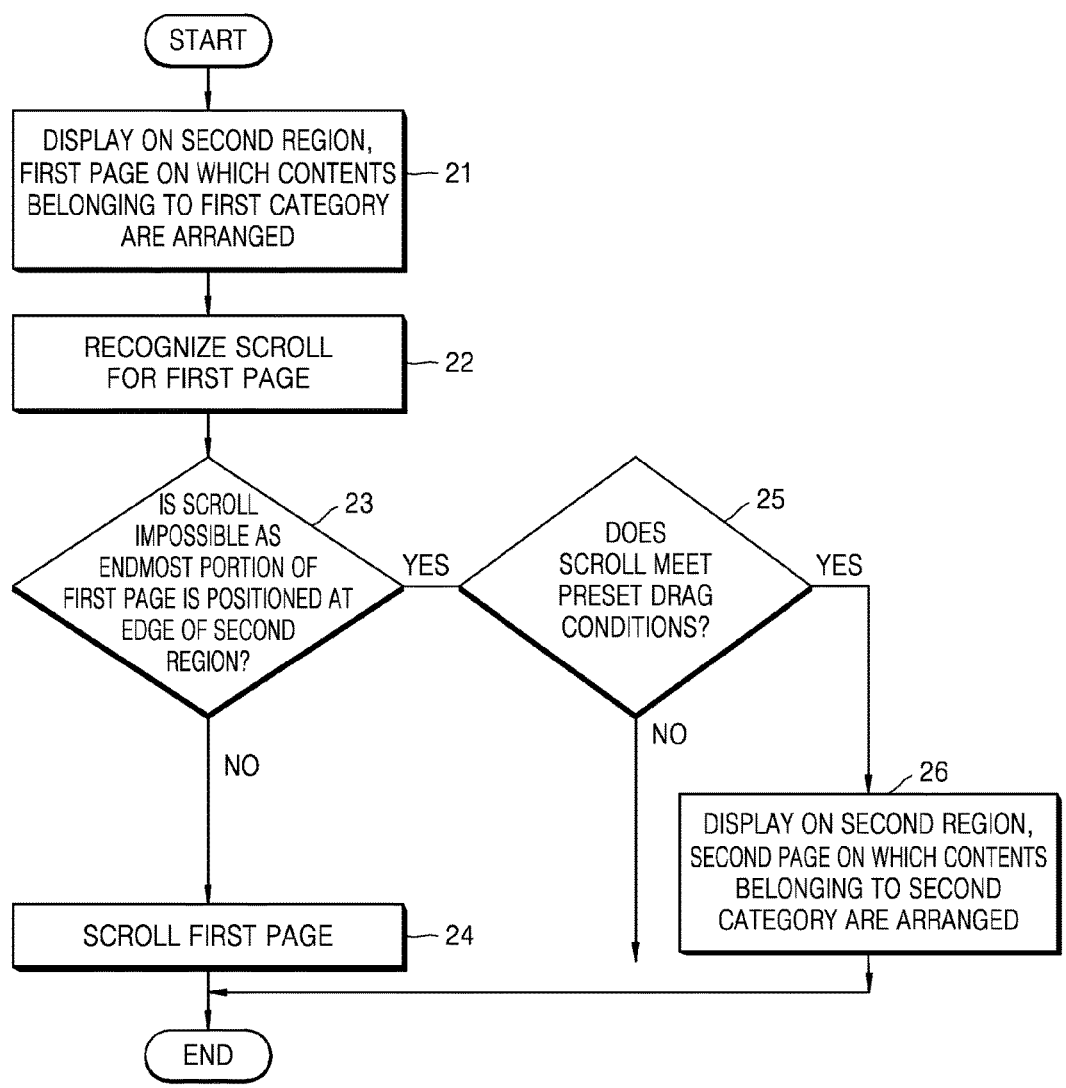
FIG. 2 is a flowchart of a display control method according to an embodiment of the inventive concept.

FIG. 2 is a flowchart of a display control method according to an embodiment of the inventive concept.

The flowchart illustrated in FIG. 2 includes operations that are processed by the display control apparatus 100 illustrated in FIG. 1. Thus, although not provided in the following description, the description provided above regarding the components illustrated in FIG. 1 may also be applied to the flowchart illustrated in FIG. 2.

Referring to FIG. 2, in operation 21, the display control unit 130 displays, in a second region, a first page on which contents belonging to the first category are arranged.

In operation 22, the scroll recognizing unit 110 recognizes a scroll signal that is input for the first page.

In operation 23, the scroll determining unit 120 determines whether scrolling of the first page is impossible as the endmost portion of the first page is positioned at the edge of the second region. If it is determined that the scrolling of the first page is impossible, the scroll determining unit 120 proceeds to operation 25, and if not, the scroll determining unit 120 proceeds to operation 24.

In operation 24, the scroll determining unit 120 controls the scroll of the first page, and outputs a scroll command for the first page to the display control unit 130 to control the display control unit 130 to scroll and display the first page.

In operation 25, the scroll determining unit 120 determines whether the scroll signal satisfies preset drag conditions. If it is determined that the scroll signal satisfies the preset drag conditions, the scroll determining unit 120 proceeds to operation 26; if not, the scroll determining unit 120 terminates a process. The scroll signal may be a drag signal, and the drag conditions may include a condition that at least one parameter of length and speed of the drag signal and a total time in which the drag signal is input exceeds a preset criterion.

In operation 26, the display control unit 130 displays in the second region, the second page on which contents belonging to the second category are arranged.

Although it is illustrated in FIG. 2 that the scroll determining unit 120 first determines the purpose of the scroll signal in operation 23 and then scrolls the first page in operation 24, this process may be modified. For example, operation 24 may be performed prior to operation 23, and once the scroll recognizing unit 110 recognizes the scroll signal in operation 22, the scroll determining unit 120 attempts to scroll the first page by using the scroll signal and if it is determined that the scrolling of the first page is impossible, the scroll determining unit 120 may proceed to operation 25.

FIGS. 3 to 9 illustrate examples of a screen according to various embodiments of the inventive concept.

Figure 3:
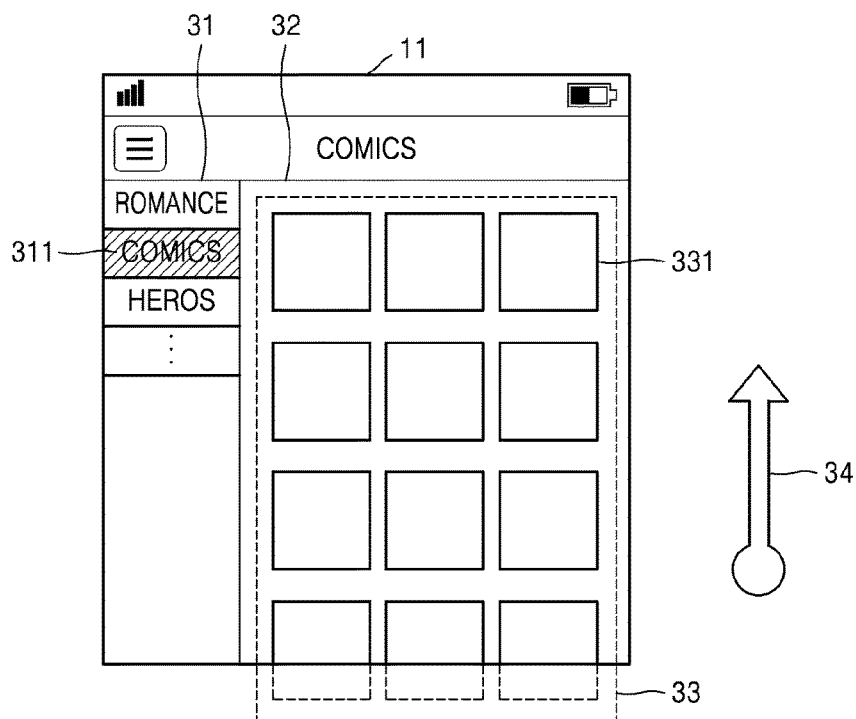
FIGS. 3 to 9 illustrate examples in which a screen provided by a display control apparatus according to an embodiment of the inventive concept is displayed.

FIG. 3 illustrates the screen 11 according to an embodiment of the inventive concept. The screen 11 includes a first region 31 and a second region 32. In the first region 31, a list of a plurality of categories is displayed. In the second region 32, a first page 33 is displayed in which contents 331 belonging to any one of the plurality of categories are arranged. In the first page 33, the contents 331 belonging to a first category 311, for example, a COMICS category, are arranged.

Referring to FIG. 3, the display control unit 130 illustrated in FIG. 1 highlights, in the first region 31, the first category 311 corresponding to the first page 33 displayed in the second region 32. In FIG. 3, shading is used as an example of highlighting. Thus, the user may recognize the contents 331 currently displayed in the second region 32 as belonging to the highlighted first category 311.

Although not illustrated in FIG. 3, the plurality of categories listed in the first region 31 may be displayed in different colors, respectively. The background or a portion of a page corresponding to each category may be displayed in a color corresponding to that category. For example, the background of the first page 33 may be displayed in a color corresponding to the first category 311. More specifically, for example, the background of the first page 33 may be displayed in the same color as the first category 311. The background of the first page 33 may also be displayed in a color that is similar to the color of the first category 311 or in a color and/or a pattern that are preset to correspond to the color of the first category 311.

Referring to FIG. 3, the plurality of categories listed in the first region 31 are displayed in a vertical direction, and the first page 33 in the second region 32 is displayed to be scrolled in the direction in which the plurality of categories are listed, for example, in the vertical direction.

Referring to FIG. 3, the user may input a drag signal 34 to scroll down the first page 33. Herein, scrolling down the page means that a region of the page displayed on the screen moves down, and the scrolling ends at the bottom end of the page. A direction of the drag signal 34 as a drag signal input by a continuous touch action may be opposite to the direction of the scroll of the page. For example, if the drag signal 34 is input in the direction from bottom to top, the first page 33 is scrolled down in the opposite direction as the drag direction. Although not shown in FIG. 3, according to another implementation, if wheel rotation of a mouse is input as the scroll signal, the direction of the rotation may be the same as the direction of the scroll of the page. For example, if the mouse wheel rotates down, the first page may be scrolled down in the same direction as the wheel direction.

Figure 4:
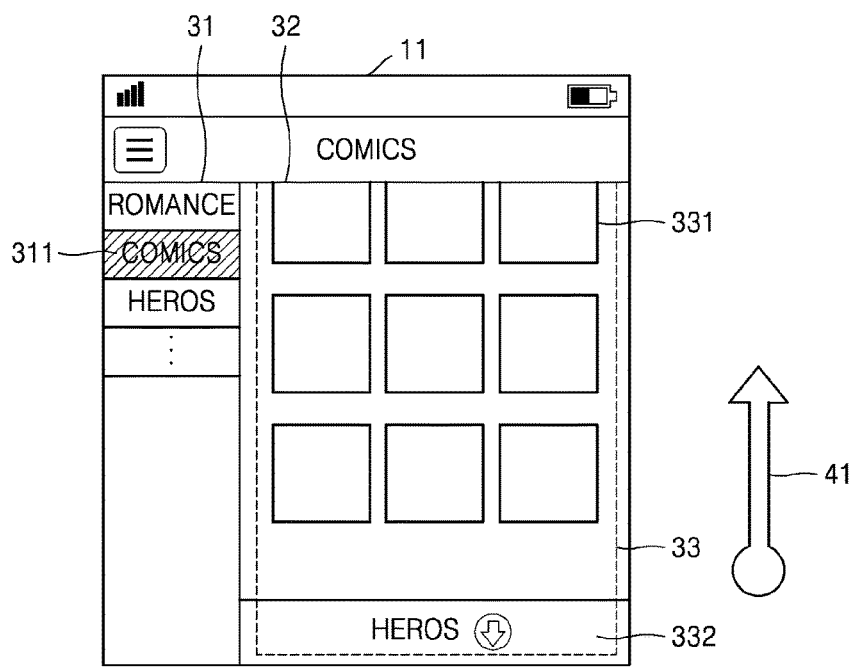

FIG. 4 illustrates a state in which a drag signal 41 is input to the screen 11 of FIG. 3 and thus the scroll is performed down to the bottom end of the first page 33.

Referring to FIG. 4, the scroll recognizing unit 110 illustrated in FIG. 1 recognizes the drag signal 41, and the scroll determining unit 120 determines a control method corresponding to the drag signal 41. The scroll determining unit 120 generates a category change command, if the drag signal 41 is a signal for dragging down the first page 33 and the bottom end of the first page 33 is positioned at the bottom end of the second region 32, such that the first page 33 may not be further dragged down.

The scroll determining unit 120 may further determine whether the drag signal 41 satisfies the preset drag conditions before generating the category change command, and if the drag signal 41 satisfies the preset drag conditions, the scroll determining unit 120 may generate the category change command; if not, neither the page scroll nor the category change is performed.

The drag conditions may include a condition of whether a parameter, such as a length, a speed, and a position of the drag signal 41 satisfies a preset criterion. For example, if the length of the drag signal 41 exceeds a preset reference length, the drag conditions are met. Alternatively, if the drag speed of the drag signal 41 exceeds a preset reference speed, the drag conditions are met. If the drag signal 41 passes a preset position, the drag conditions are met. For example, in FIG. 4, the drag conditions are satisfied if the drag signal 41 has been input until a point spaced apart by a predetermined distance from the bottom end of the second region 32 is passed.

According to the determination regarding the drag conditions, the category is changed to another if a signal satisfying the drag conditions is input, rather than if the scroll signal is input at an end portion of the page, thereby preventing undesired category change and corresponding inconvenience.

The category change command may be a change command from the COMICS category, which is the example first category 311, to a ROMANCE category or a HEROS category, which is an example second category listed adjacent to the first category 311, and upon a category change, the page displayed in the second region 32 may be changed.

The second category is determined according to a page scroll direction corresponding to the drag signal 34. For example, the drag signal 34 is a signal for scrolling down the first page 33, such that the HEROS category, which is listed below the first category 311 corresponding to the currently displayed first page 33, that is, the COMICS category, may be determined as the second category.

The display control unit 130 may display a panel 332 for notifying change to the second category at the edge of the first page 33 before changing the first page 33, if the category change command is generated. The position of the panel 332 may be determined depending on the scroll direction of the page. For example, in FIG. 4, the scroll direction of the page is 'down', such that the panel 332 is displayed at the bottom end of the first page 33.

The panel 332 may display the name of the second category or an image of a downward arrow indicating movement to a lower category. However, the display of the panel 332 is not limited to the example illustrated in FIG. 4, and the panel 332 may display the second category with a color or a pattern, or in various ways.

Figure 5:
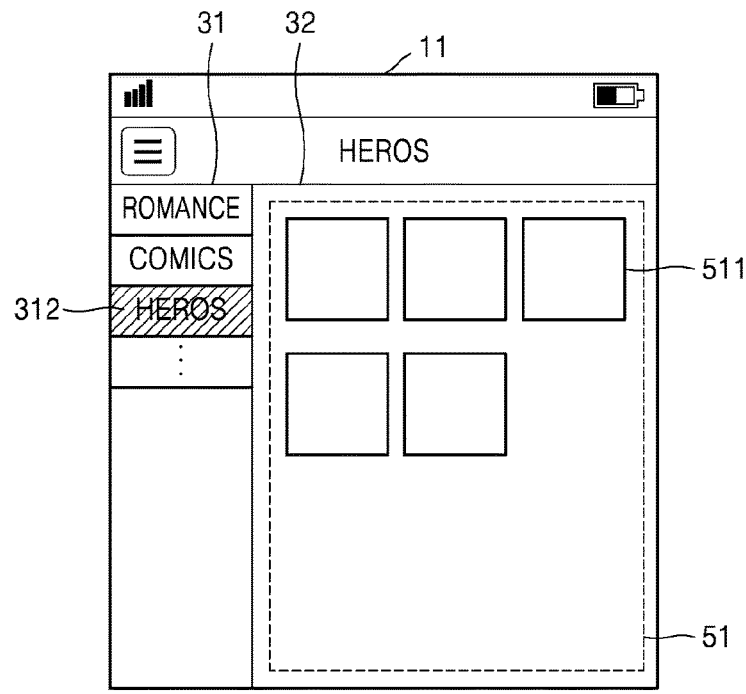

FIG. 5 illustrates an example in which the first page 33 is changed to the second page according to the input of the drag signal 41 illustrated in FIG. 4. More specifically, FIG. 5 illustrates the screen 11 after the category is changed by the category change command generated based on the determination regarding the drag signal 41 illustrated in FIG. 4.

Referring to FIG. 5, on a second page 51 displayed in the second region 32, contents 511 belonging to a second category 312 are arranged. The highlighted display of the first category 311 of FIG. 4 is released, and the second category 312 is highlighted. Although not shown in FIG. 5, the background color of the second page 51 may correspond to the color (or pattern) of the second category 312.

The display control unit 130 of FIG. 1 may apply animation to the second page 51 when the second page 51 illustrated in FIG. 5 is shown in the second region 32. For example, an animation increasing the size of the contents 511 included in the second page 51, an animation moving each content 511, and the like may be applied. The application of the animation may contribute to the user's intuitive recognition of change to a new page rather than a simple scroll of contents included in the present page.

Referring to FIGS. 3, 4, and 5, the user inputs a drag signal satisfying predetermined drag conditions when the current page is scrolled to the end of the page, thereby being changed to another page. The new page is determined according to the direction of the drag signal, and the display of the first region 31 is also changed in synchronization with the page change, thus allowing the user to intuitively recognize how the page is changed.

Figure 6:
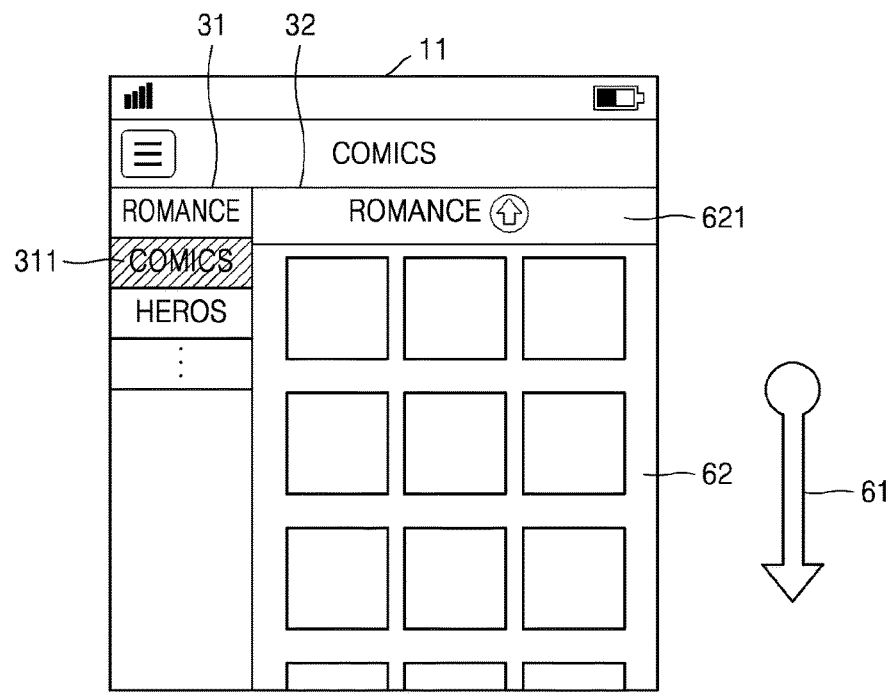

FIG. 6 illustrates an example in which a drag signal 61 is input in the opposite direction to that of the drag signal 34 when the screen 11 having the same configuration as the screen 11 illustrated in FIG. 3 is displayed.

Referring to FIG. 6, the drag signal 61 is a continuous input from top to bottom and is recognized as a signal for scrolling up a first page 62. Referring to FIG. 6, the top end of a first page 62 displayed in the second region 32 is positioned in the top end of the second region 32, and thus further scrolling up is not possible. In this case, the scroll determining unit 120 of FIG. 1 may generate a category change command. The category change command may indicate movement from the first category to the second category, and as the category is changed, the page displayed in the second region 32 is changed and the display of the first region 31 may be changed.

The scroll determining unit 120 determines the second category according to the scroll direction of the page corresponding to the drag signal 61. For example, in FIG. 6, the scroll direction of the page corresponding to the drag signal 61 is 'up', and the ROMANCE category listed above the first category 311 may be determined as the second category.

The scroll determining unit 120 determines whether the drag signal 61 satisfies the preset drag conditions, before generating the category change command, and if the drag signal 61 satisfies the preset drag conditions, the scroll determining unit 120 generates the category change command. Otherwise, if the drag signal 61 does not meet the preset drag conditions, neither page scroll nor category change is performed.

The display control unit 130 may display a panel 621 for notifying a change to the second category at the edge of the first page 62 if the category change command is generated, before making the change from the displayed first page 62. The position of the panel 621 is determined according to the scroll direction of the page. For example, in FIG. 6, the scroll direction of the page is 'up', and accordingly, the panel 621 may be displayed at the top end of the first page 62.

The panel 621 may display the name of the second category or an image of an upward arrow indicating movement to the second category. However, the display of the panel 621 is not limited to this example, and the panel 621 may display the second category with a color or pattern, or in various ways.

Figure 7:
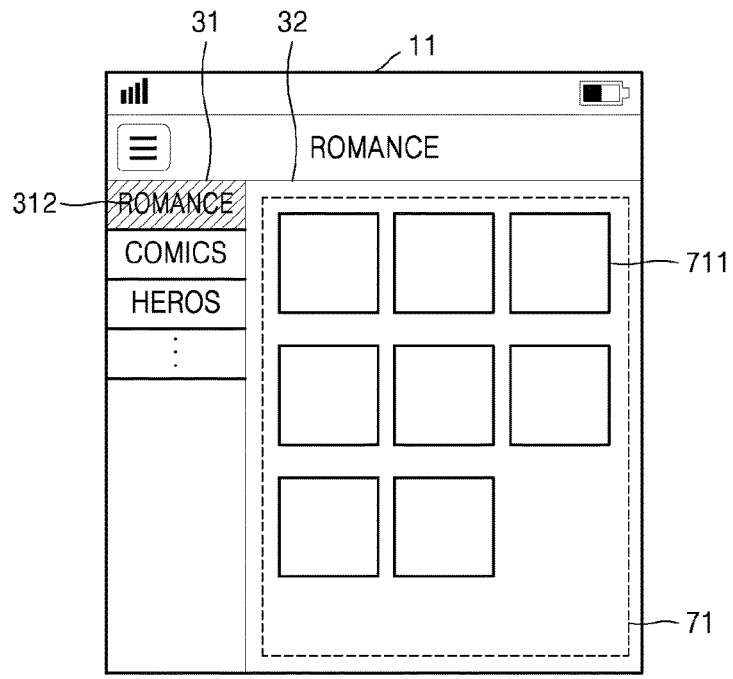

FIG. 7 illustrates an example in which the first page is changed to the second page according to the input of the drag signal 61 illustrated FIG. 6. More specifically, FIG. 7 illustrates the screen 11 after the category is changed by the category change command generated based on the determination regarding the drag signal 61 illustrated in FIG. 6.

Referring to FIG. 7, on a second page 71 displayed in the second region 32, contents 711 belonging to the second category 312 are arranged. The highlight applied to the first category 311 of FIG. 6 is released and the second category 312 is highlighted. Although not shown in FIG. 7, the background color of the second page 71 may correspond to the color (or pattern) of the second category 312.

The display control unit 130 of FIG. 1 may apply animation to the second page 71 when the second page 71 illustrated in FIG. 7 is shown in the second region 32. An example of an animation has already been described with reference to FIG. 5, and thus will not be described again.

Referring to FIGS. 3 to 7, the user inputs a drag signal satisfying predetermined drag conditions when scrolling down or up to the end of a page, thereby being changed to another page. For example, when scrolling down to the bottom end of the page, the user inputs a drag signal satisfying predetermined drag conditions to change the page to a page of a lower category. On the other hand, when scrolling up to the top end of the page, the user inputs a drag signal satisfying predetermined drag conditions to change the page to a page of an upper category. The changed new page is determined according to the direction of the drag signal, and the display of the first region 31 is also changed in synchronization with the page change, thus allowing the user to intuitively recognize how the page is changed.

Figure 8:
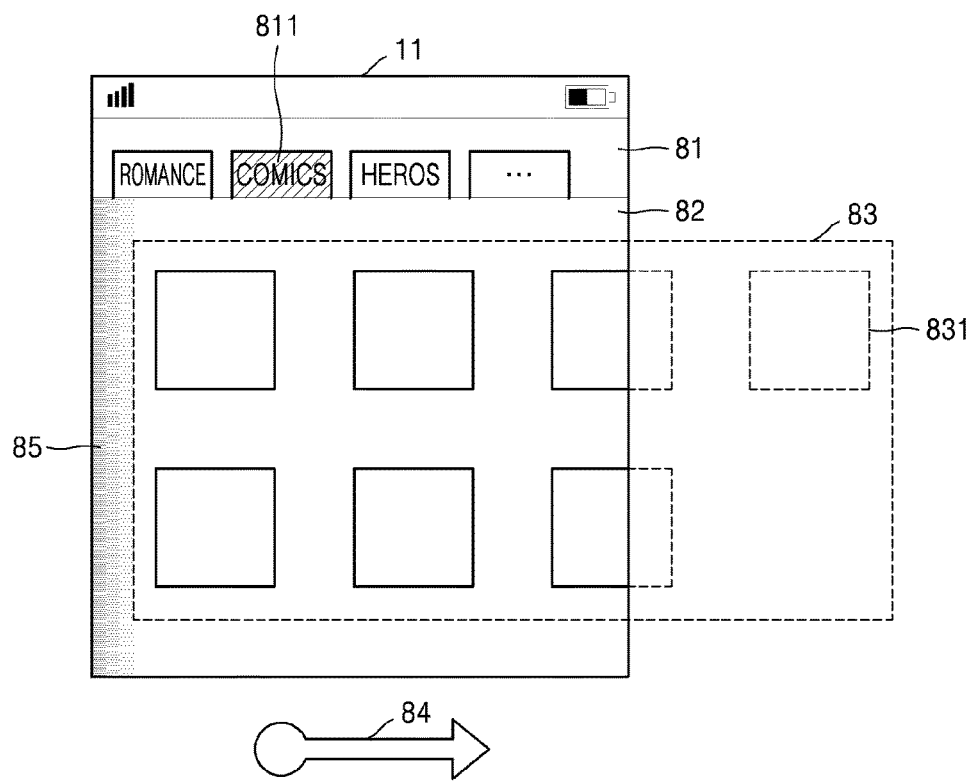

FIG. 8 illustrates the screen 11 according to another embodiment of the inventive concept.

While a plurality of categories are listed in the vertical direction and page scroll is performed in the vertical direction in FIGS. 3 to 7, FIG. 8 illustrates an opposite example. That is, the plurality of categories are listed in the horizontal direction and a first page 83 is scrollable in the horizontal direction Referring to FIG. 8, a first region 81 and a second region 82 are disposed vertically with respect to each other. In FIG. 8, the first region 81 is disposed above the second region 82, for example. The second region 82 displays the first page 83 on which contents 831 belonging to a first category 811 are displayed, and the first region 81 lists a plurality of categories.

Referring to FIG. 8, a scroll left command corresponding to a drag signal 84 is recognized. The drag signal 84 may be a drag signal that is input from left to right, such that a command for scrolling the first page 83 to the left may be generated. In FIG. 8, scroll to the left is recognized, and the left end of the first page 83 is positioned at the edge of the second region 82 and thus further left scroll is not possible. In this case, the scroll determining unit 120 of FIG. 1 may generate a category change command. The category change command may indicate movement from the first category to the second category, and as the category is changed, the page displayed in the second region 82 is changed and the display of the first region 81 is changed.

The scroll determining unit 120 determines the second category according to the scroll direction of the page corresponding to the drag signal 84. For example, in FIG. 8, the scroll direction of the page corresponding to the drag signal 84 is 'left', and the ROMANCE category, listed to the left of the first category 811, may be determined as the second category.

Before generating the category change command, the scroll determining unit 120 determines whether the drag signal 84 satisfies preset drag conditions. If the drag signal 84 satisfies the preset drag conditions, the scroll determining unit 120 generates the category change command; if not, neither page scroll nor category change is performed.

Before a category change is performed, the display control unit 130 displays an indication of the category change by using a panel 85 at the left end of the first page 83. In FIG. 8, the panel 85 is shaded by gradation. As illustrated in FIG. 8, the panel 85 may be displayed simply to indicate a category change or a page change, without providing information about a category to which the category change is to be made.

Figure 9:
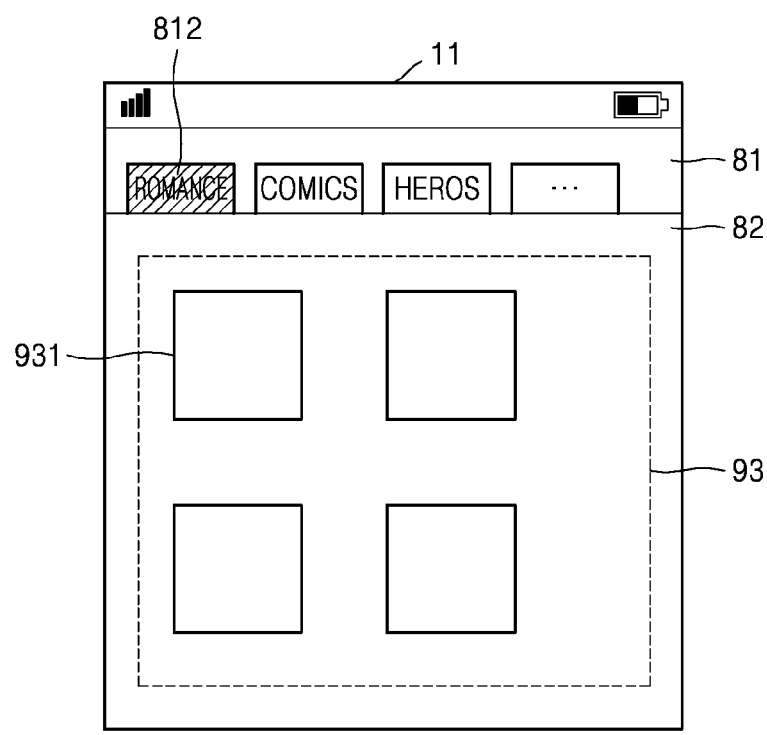

FIG. 9 illustrates an example in which a page change is performed by the input of the drag signal 84 on the screen 11 of FIG. 8. More specifically, FIG. 9 illustrates the screen 11 on which the category has been changed by the category change command generated based on the determination regarding the drag signal 84 illustrated in FIG. 8.

Referring to FIG. 9, on a second page 93 displayed in the second region 82, contents 931 belonging to a second category 812 are arranged. The highlight applied to the first category 811 of FIG. 8 is released, and the second category 812 is highlighted. Although not illustrated in FIG. 9, the background color of the second page 93 may correspond to the color (or pattern) of the second category 812.

The display control unit 130 of FIG. 1 may apply animation to the second page 93 illustrated in FIG. 9 when the second page 93 is shown in the second region 82, and an example of the animation has been described with reference to FIG. 5 and thus will not be described in detail at this time.

Referring to FIGS. 8 and 9, the user inputs a drag signal satisfying predetermined drag conditions when scrolling to the left or right to the end of the page, thereby changing the page to another page. For example, the user may input a drag signal satisfying predetermined drag conditions when scrolling to the left end of the page, thus changing the current page to a new page corresponding to a category positioned to the left side of the current category. On the other hand, the user may input a drag signal satisfying predetermined drag conditions when scrolling to the right end of the page, thus changing the current page to a new page corresponding to a category positioned to the right side of the current category. The new page is determined according to the direction of the drag signal, and the display of the first region 81 is also changed in synchronization with the page change, thus allowing the user to intuitively recognize how the page is changed.

According to the foregoing embodiments, after seeing contents belonging to a category, the user may see contents belonging to the next or previous category merely by a scroll action without directly clicking a corresponding category item.

In addition, a convenient user interface is provided such that through a continuous scroll action for seeing contents displayed on the screen, the user may see contents belonging to the next or previous category.

Moreover, a category change is indicated by highlights on a category list provided in a separate region, and the background of a page is displayed differently according to the color or the pattern of each category. In a category change, a predetermined panel is displayed to notify the user of the category change in advance. Thus, the user may recognize that the category is changed by the scroll action, such that the user is prevented from erroneously recognizing that contents in the same category are still displayed, in spite of the category change.

The display control method according to an embodiment illustrated in FIG. 2 may be implemented with a program executable on a computer, and may be implemented on a general-purpose digital computer for executing the program by using a computer-readable recording medium. Examples of the computer-readable recording medium may include storage media such as magnetic storage media (e.g., ROM, floppy disks, hard disks, etc.) and optical recording media (e.g., CD-ROMs, or DVDs).

According to an embodiment of the inventive concept, a program for executing the display control method on a computer and a distribution server for distributing the program are provided.

As described above, according to the one or more of the above exemplary embodiments, a display control method and apparatus capable of performing a page change by using a scroll action are provided, contributing to user convenience.

Moreover, according to the one or more of the above exemplary embodiments, a page scroll or a page change is performed according to a scroll action or a position of a page, and in the page change, the direction of the scroll action is taken in to account and various display effects are applied, allowing the user to intuitively recognize the page change.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A computer-implemented display control method for controlling pages displayed on a screen comprising:
    a first display operation of displaying, in a second region of the screen, a first page on which contents belonging to a first category are arranged, and displaying a plurality of categories in a first region of the screen in a vertical direction or a horizontal direction, wherein the first page is displayed to be scrollable in a direction in which the plurality of categories are displayed;
    a recognition operation of recognizing a scroll signal which is input with respect to the first page;
    a determination operation of scrolling the first page in a first direction in the second region of the screen based on the scroll signal when the first page is not located at a predetermined position in the second region, changing from the first category to a second category in the plurality of categories based on the scroll signal for scrolling the first page in the first direction when the first page is located at the predetermined position in the second region and the scroll signal satisfies preset drag conditions, and not changing from the first category to the second category in response to the scroll signal for scrolling the first page in the first direction when the first page is located at the predetermined position in the second region and the scroll signal does not satisfy the preset drag conditions; and
    a second display operation of displaying, in the second region of the screen, a second page on which contents belonging to a second category are arranged, when the category change command is generated.

2. The display control method of claim 1, wherein the second category is listed adjacent to the first category in the first region, and the second category is determined according to a direction of the scroll signal.

3. The display control method of claim 1, wherein the plurality of categories are displayed in different colors, a color of the first page is displayed based on a color of the first category, and a color of the second page is displayed based on a color of the second category.

4. The display control method of claim 1, wherein the first display operation comprises highlighting the first category displayed in the first region, and the second display operation comprises releasing the highlighting of the first category displayed in the first region and highlighting the second category.

5. The display control method of claim 1, wherein in the determination operation, a direction of the scroll signal is a direction for scrolling the first page in a first direction, and the category change command is generated when an end portion of the first page along the first direction is positioned at an edge of the second region.

6. The display control method of claim 1, wherein the scroll signal is a drag signal, and the determination operation comprises:
    a first determination operation of determining whether an end portion of the first page along the first direction is positioned at an edge of the second region, if the direction of the scroll signal is a direction for scrolling the first page in the first direction; and
    a second determination operation of determining whether the scroll signal satisfies the preset drag conditions, and wherein the category change command is generated when the end portion of the first page along the first direction is positioned at the edge of the second region, in the first determination operation and the scroll signal satisfies the preset drag conditions in the second determination operation.

7. The display control method of claim 6, wherein the first determination operation comprises determining that further scrolling of the first page in the first direction is not possible, when the end portion of the first page in the first direction is positioned at an edge of the second region in the first direction.

8. The display control method of claim 6, wherein drag conditions indicate that at least one parameter of a length of the drag signal, a speed of the drag signal and a total time in which the drag signal is input exceed preset criteria.

9. The display control method of claim 6, wherein the preset drag conditions comprise at least one of a first condition that a length of the drag signal exceeds a preset criterion and a second condition that the drag signal passes through a point spaced apart from the end portion of the first page along the first direction by a preset reference distance.

10. The display control method of claim 6, wherein the drag signal is input as a continuous touch signal.

11. The display control method of claim 1, wherein the second display operation comprises applying a predetermined animation to the second page when changing from the first page displayed in the second region to the second page.

12. The display control method of claim 1, wherein the second display operation comprises displaying at least one of a text, an image, a color and animation representing the second category at an end portion of the first page, before displaying the second page.

13. An Apparatus for controlling display of a screen on a user terminal, the apparatus comprising:
   at least one processor operatively connected to the screen, and including a plurality of functional units for controlling contents displayed on the screen, the functional units including,
   a scroll recognizing unit configured to recognize a scroll signal which is input with respect to a first page displayed in a second region of the screen;
   a scroll determining unit configured to scroll the first page in a first direction based on the scroll signal when the first page is not located at a predetermined position in the second region, changing from the first category to a second category in the plurality of categories based on the scroll signal for scrolling the first page in the first direction when the first page is located at the predetermined position in the second region and the scroll signal satisfies preset drag conditions, and not changing from the first category to the second category in response to the scroll signal for scrolling the first page in the first direction when the first page is located at the predetermined position in the second region and the scroll signal does not satisfy the preset drag conditions; and
   a display control unit configured to display, in the second region of the screen, the first page on which contents belonging to a first category are arranged, to list a plurality of categories in a vertical or horizontal direction and display the plurality of categories in a first region of the screen, wherein the first page is displayed to be scrollable in a direction in which the plurality of categories are listed, and to display, in the second region, a second page on which contents belonging to a second category are arranged when the category change command is generated.

14. The apparatus of claim 13, wherein the plurality of categories comprise the first category and the second category,
   the second category is listed adjacent to the first category, and
   the scroll determining unit determines the second category to be displayed according to a direction of the scroll signal.

15. A non-transitory computer readable storage medium storing a computer program which, when executed by a computer, enables the computer to perform the display control method according to claim 1.

* * * * *